United States Patent [19]

Vermeulen

[11] Patent Number: 5,056,622
[45] Date of Patent: Oct. 15, 1991

[54] OIL LEVEL REGULATOR

[75] Inventor: Martin A. Vermeulen, Utrecht, Netherlands

[73] Assignee: Groeneveld Transport Efficiency B.V., Gorinchem, Netherlands

[21] Appl. No.: 574,422

[22] Filed: Aug. 30, 1990

[30] Foreign Application Priority Data

Sep. 6, 1989 [NL] Netherlands .......................... 8902235

[51] Int. Cl.$^5$ .......................... F01M 1/18; F01M 11/10
[52] U.S. Cl. ........................................ 184/6.4; 184/1.5; 184/6.3; 184/103.1; 123/196 S
[58] Field of Search ............... 184/1.5, 6.3, 6.4, 103.1, 184/108; 340/450.3, 438; 364/424.05; 123/196 S, 196 R

[56] References Cited

U.S. PATENT DOCUMENTS

| | | | |
|---|---|---|---|
| 2,671,529 | 3/1954 | Hungerford | 184/103.2 |
| 2,722,286 | 11/1955 | Lyttle | 184/103.2 |
| 3,229,712 | 1/1966 | Perkins . | |
| 3,876,037 | 4/1975 | Rath . | |
| 4,306,525 | 12/1981 | Faxuog | 123/196 S |
| 4,491,103 | 1/1985 | Deadman | 184/103.1 |
| 4,495,909 | 1/1985 | Hurner | 184/103.1 |
| 4,632,080 | 12/1986 | Hurner | 184/6.4 |
| 4,794,897 | 1/1989 | Kinouchi | 123/196 S |
| 4,967,700 | 11/1990 | Torigai | 123/196 S |
| 4,989,560 | 2/1991 | Rasdal et al. | 123/196 S |
| 4,995,357 | 2/1991 | Gonnering et al. | 123/196 S |

FOREIGN PATENT DOCUMENTS

| | | |
|---|---|---|
| 0102080 | 3/1984 | European Pat. Off. . |
| 1576372 | 4/1970 | Fed. Rep. of Germany . |
| 2182442 | 5/1987 | United Kingdom . |

Primary Examiner—Ira S. Lazarus
Assistant Examiner—Alan B. Cariaso
Attorney, Agent, or Firm—Young & Thompson

[57] ABSTRACT

An oil level regulator for an internal combustion engine, provided with a lubricating oil sump and a starter motor operated by an ignition switch having an ignition lock. An enclosed measuring chamber communicates with the oil in the engine sump, so that the same oil level occurs in the measuring chamber as in the sump. A tank for topping-up oil is connected to the sump by a controllable shut-off device. A level measuring device in the form of a sensor emits an electrical signal as to whether the oil level is correct or too low. If "correct", then the ignition lock is released for a predetermined period, so that the engine can be started. If "too low", a shut-off device is opened for a predetermined period, to allow a certain quantity of oil to the sump, then to measure the oil level again and, if "correct", to release the ignition lock.

7 Claims, 1 Drawing Sheet

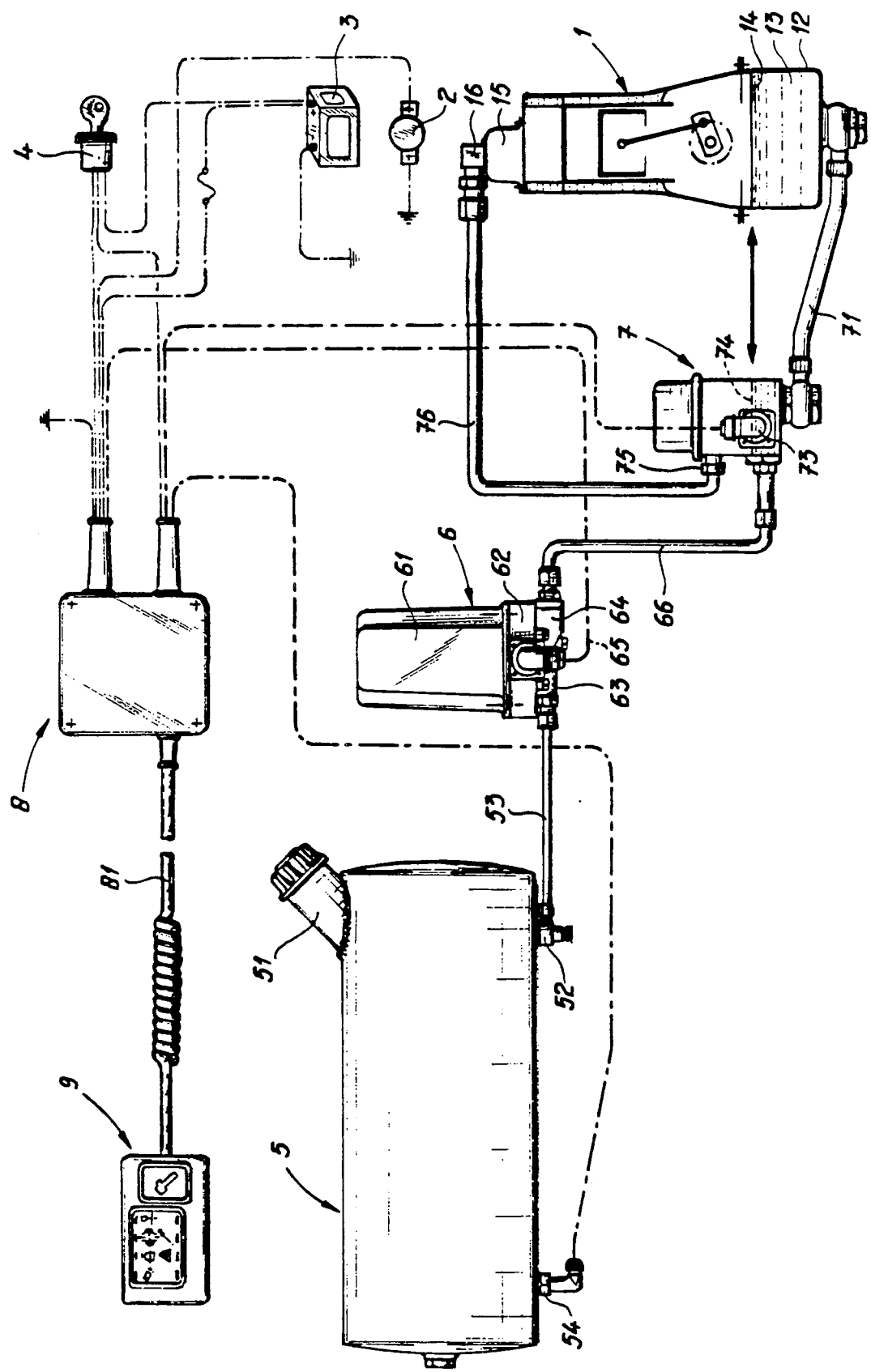

OIL LEVEL REGULATOR

The invention relates to an oil level regulator for an internal combustion engine.

Such a device is known from European Patent Application 0,161,225 A2. The device described in this publication for maintaining a constant lubricating oil level in the sump of an internal combustion engine is provided with a shut-off device which is fitted in the enclosed space and is controlled in the usual manner by a float. Although this device is simple in design, like other similar devices, it is still sensitive to vibrations as a result of the necessarily light structure of the float. The device also measures the lubricating oil level when the engine is working, so that accelerations and decelerations acting on the engine can cause a falsified signal, as a result of which it is easy in particular for too high a lubricating oil level to be produced in the sump.

While maintaining the advantages of the known design, such as the use of a small enclosed measuring chamber in communicating connection with the oil in the engine sump, in which the level measuring device is fitted, it is the object of the invention to eliminate the disadvantages and to provide a much more reliable device based on a safer control system.

The oil level regulator is then according to the invention characterized in that:
the shut-off device is electrically remote-controlled,
the level measuring device is in the form of a sensor for emitting an electrical signal (correct level, or level too low),
a control device, such as a processor, is provided for controlling the shut-off device, which control device has a feed input and at least one input for the signal from the sensor and from the ignition switch of the engine, and has an output to the shut-off device and is programmed to measure the oil level only when the engine is off, after the ignition lock is placed in a first position, and
a) if "correct", then to release the ignition lock for a predetermined period, so that the engine can be started, if necessary repeatedly, by placing the ignition lock in a second position, or
b) if "too low", to open the shut-off device for a predetermined period, in order to allow a certain quantity of oil to the sump, then to measure the oil level again and, if "correct", to release the second or starting position of the ignition lock.

According to the invention, the level measuring device, designed as a sensor for emitting an electrical signal, is fitted in the measuring chamber. Such a sensor of a type without moving parts is known per se, and its great reliability and insensitivity to vibrations and other accelerations and decelerations are also known. The shut-off device is electrically remote-controlled and is controlled by a separate control device by means of the electrical signal emitted by the level measuring device. In addition, an essential part of the invention is constituted by the programming of the control device in the form of a processor. Before the starter contactor is released by means of the ignition lock, the oil level is first gauged and, if necessary, a suitable quantity of lubricating oil is introduced through the shut-off device. This ensures that the engine is prevented from starting if the lubricating oil level is too low. Since checking and topping-up take place only when the engine is stopped, topping-up mistakes as a result of movements of the engine or of the vehicle or vessel in which the engine is installed are normally ruled out.

The lubricating oil can flow out of the topping-up tank, for example under the influence of gravity, to the sump during the predetermined period that the shut-off device is open. According to a preferred embodiment of the invention, the shut-off device is, however, in the form of a pump which is driven by an electric motor and which acts as a shut-off valve when at a standstill, but when driven conveys the appropriate quantity of lubricating oil to the sump in a much shorter time. Partly on account of the simple construction, the easy availability and the good shut-off action when at a standstill, a gear pump is preferably used for this purpose. An additional advantage is that every topped-up volume is essentially constant and that the topping-up tank can be provided at any desired height and at a distance from the sump. When an electrically driven pump is used as the shut-off device, the topping-up oil can be fed at any desired point into a lubricating oil space of the engine or into the sump. The number of pipes can, however, be limited and the accuracy of level measurement promoted if the pump delivers the topping-up volume into the enclosed measuring chamber. So that, particularly in the case of cold lubricating oil, the oil levels in the measuring chamber and in the sump will be equal again soon after filling, it is advisable to make the connecting pipe between the measuring chamber and the sump sufficiently large.

According to a number of preferred embodiments, in particular of the programming of the control processor, a second volume is always automatically topped up if the level after the first topping-up was not yet correct. Since in practice it will virtually never happen that topping-up has to take place more than twice, other than when a serious fault occurs, such as lack of topping-up oil, damaged pipes and the like, it is desirable to give an alarm signal if the level is still too low after the second topping-up. In that case the engine driver can gauge the lubricating oil manually and/or indicate the fault. An emergency switch with break seal by means of which the engine can still be started, is also provided.

It is also desirable to provide the control processor with a self-checking program which checks itself in the known manner in a very short time before starting with the cycle. Of course, a suitable signal is given in the event of a fault.

Since the viscosity of lubricating oil depends greatly on the temperature, it can be desirable in some circumstances to extend the topping-up period when the temperature has dropped or is dropping, and vice versa, so that an essentially constant oil volume is always topped up. For this, the unit is provided with a temperature sensor, preferably provided in or near the topping-up tank, which emits a signal to the processor.

In a manner which is known per se, the processor can also be provided with a memory which stores the number of times of oil checking, topping-up, the level in the topping-up tank and/or the operation of the emergency switch, and can subsequently deliver this through a port for a read-out. Said storage and port are preferably of the serial type.

Finally, in particular in the case of road vehicles, it can happen that, despite the fact that the engine is stopped, it is stopped at such an angle of gradient that the reading in the measuring chamber via the communicating connection to the sump produces an incorrect signal. Such an angle can be approximately 15° for road vehicles, in any desired direction relative to the horizontal. In that case an individually fitted angle of gradient sensor will give a signal which temporarily bypasses the blockage of starting, and thus the topping-up process.

The topping-up tank can also be provided with a level sensor, from which the signal is also conveyed to the processor. Finally, it is desirable to provide the measuring chamber with a vent line running to the valve cover of the engine, so that the communicating connection between the sump and the chamber cannot be disturbed by possible pressure differences above the levels.

A preferred embodiment of the oil level regulator according to the invention is explained by way of example in the description below of the appended figure, which is a schematic view of an internal combustion engine having a lubricating system with an oil level regulator according to the invention.

The internal combustion engine, as the main component, is indicated by 1, its starter motor by 2, its battery by 3, and its ignition lock by 4. The lubricating oil topping-up tank is indicated by 5, and a shut-off device in the form of a gear pump by 6. Reference number 7 indicates the enclosed measuring chamber, while a processor is indicated by 8 and a display by 9. The drawing shows a number of lubricating oil and other pipes, and also electrical connections, which all speak for themselves. They will be mentioned individually below only insofar as they are of importance in connection with the invention.

The engine 1 is provided with a sump 12 containing lubricating oil 13 up to a level 14. A valve cover 15 is shown schematically on the top side of the engine. The engine is mounted elastically in a manner not shown further, but known, in, for example, the chassis of a vehicle. It can therefore carry out movements relative to the chassis.

The tank 5 for topping-up oil is mounted at a suitable place on the chassis of the vehicle and can have a capacity of approximately 15 liters in the case of a heavy lorry or large bus. It is provided with a filling cap 51 and a discharge connection 52.

The shut-off device 6 in the form of an electrically driven gear pump consists of an electric motor 61 which is placed on the gear pump 62 driven by it. The gear pump has a suction connection 63 and a delivery connection 64. This pump is also preferably fixed on the chassis, and preferably in the vicinity of the engine 1. The electrical supply is through an electrical cable 65.

The measuring chamber 7 is openly connected by means of a connecting pipe 71 to the sump 12 of the engine. According to the communicating tanks principle, the lubricating oil level 74 in the measuring chamber 7 must be the same as the level 14 in the sump 12. For this, the measuring chamber 7 must be mounted with means not shown at the correct level relative to the engine. In order to rule out as far as possible the influence of slightly sloping positions of the engine relative to the horizontal, the measuring vessel 7 must be placed as near as possible to the engine. For this, it is possible to mount the measuring vessel 7 directly on the engine, but this has the disadvantage that the sensor 73 which is mounted in the measuring vessel is subjected to the vibrations of a running engine. It is therefore also possible to mount the measuring chamber 7 on the chassis in the vicinity of the engine. In that case the lubricating oil pipe 71 must be made flexible. In order to disturb the communicating effect as little as possible, it is desirable to keep the pressure in both spaces above the oil levels 14 and 74 equal in all circumstances. For this, the measuring chamber 7 above the oil level 74 is connected by means of a connection 75 and a pipe 76 at a point 16 to the top side of the inside of the valve cover 15 of the engine 1. If necessary, this pipe must, of course, be made flexible.

In the drawing the topping-up lubricating oil runs from the topping-up tank 5 to the sump 12 through a first pipe piece 53 forming the connection between the topping-up tank 5 and the suction connection 63 of the gear pump 6. A pipe 66 runs from the delivery connection of the pump 64 to the measuring chamber 7, and from there via the communication pipe 71 to the sump 12. This run of the pipes is preferably used because it ensures that the measuring chamber 7 and the sensor 73 come into contact only with fresh, clean and unacidified lubricating oil. The consumption of lubricating oil normally takes place in the engine alone, so that the direction of flow of the lubricating oil is always from the topping-up tank 5 to the sump 12. The pipe 71 is therefore always filled with fresh lubricating oil. Only when the vehicle is placed at considerable gradients, in the drawing with an inclination to the left, will the oil flow out of the sump 12 through the pipe 71 to the measuring chamber 7. The volume of the measuring chamber 7 is, however, so small that only clean and fresh lubricating oil flows out of the pipe 71 to the measuring chamber 7, so that it too remains clean inside in these circumstances. A further advantage of this design is the fact that there is only one lubricating oil-carrying pipe, namely the pipe 71, between the sump 12 on the vibrating engine and the chassis. A slight disadvantage of this is that, particularly at extremely low temperatures, it takes some time after a topping-up operation to make the oil level 74 in the measuring chamber 7 equal to the level 14 in the sump 12.

It will, however, be clear that it is equally possible to run the pipe 66 coming from the delivery connection of the pump 6 directly to the sump 12. Since the communicating connection 71 still has to be there in any case, this means that two pipes, namely 66 and 71, then have to run from the chassis to the sump. A major disadvantage of this is also that during topping-up directly to the sump 12 used lubricating oil can flow through the pipe 71 to the measuring chamber 7.

Although the embodiment with the pump described above is preferred, it is, however, also possible to replace the pump by an electromagnetically operated valve. In that case the topping-up tank 5 must be placed high enough above the sump 12, so that lubricating oil can flow by the force of gravity to the sump 12 when such an electromagnetically operated valve is open. In this connection it should also be pointed out that the embodiment shown is again preferable for the reason that both the topping-up tank 5 and the pump 6 can be mounted at any place and height in the vehicle.

Reference number 8 indicates the control device in the form of a processor which is fed from the battery 3. It also receives input signals from the ignition lock 4, from the level sensor 73, and, as the case may be from a level sensor 54 mounted on the topping-up tank 5. The electric cables required for this are shown schematically and need no further explanation. The processor 8 is also connected by means of a cable 81 to a display 9. Where such a display is used, it must, of course be mounted in the driver's field of vision. The working of the processor and any deviations or faults can be displayed on the display. The processor 8 is programmed as described in the introduction to the description, and it therefore seems superfluous to repeat this here. Briefly, after the ignition key is turned into a first position in the ignition lock 4, the electronic circuit checks itself quickly and then checks the oil level 14, 74 by means of a signal from the sensor 73. If this level is correct, the processor 8 releases the ignition lock 4 for further turning of the key to the starting position of the engine, so that the starter motor 2 is energized and the engine 1 can be started up.

If, however, the level measurement indicates that the level is too low, then the processor sends a signal to the pump 6 to pump topping-up oil to the sump 12 for a predetermined period. In particular when a gear pump 62 is used as the pump, the quantity of oil pumped in a fixed period of time is essentially constant. After that the level is measured again with the aid of the sensor 73, and if this is found to be in order the ignition lock 4 is then released. If the level is still not correct, another same quantity of topping-up oil is pumped for the second time to the sump. If the level is then correct, the ignition lock 4 is released to start the engine. If the level is still not correct, the topping-up cycle stops, and the processor displays a fault on the display 9, so that the driver can locate and/or correct the fault manually. Not shown in the drawing is the possibility of still being able to start the engine by means of an emergency switch provided with a break seal. Also not shown is a temperature sensor, preferably to be mounted on the topping-up tank 5, which can also send a signal to the processor 8. With said sensor the duration of topping-up can be extended at low temperatures. Nor is it shown that the processor 8 can be provided with a read-out port in order to provide stored information subsequently to the management, by way of a log.

What is claimed:

1. In an oil level regulator for an internal combustion engine, provided with a lubricating oil sump and a starter motor operated by means of an ignition switch having an ignition lock, comprising:

an enclosed measuring chamber which by means of an oil pipe is in communicating connection with the oil in the engine sump, so that the same oil level occurs in the measuring chamber as in the sump, a tank for topping-up oil, which is connected to the sump by means of a controllable shut-off device, a level measuring device in the measuring chamber at the level of the desired oil level in the sump, which controls the shut-off device; the improvement wherein the shut-off device is electrically remote-controlled, the level measuring device is in the form of a sensor for emitting an electrical signal as to whether the oil level is correct or too low, a control device for controlling the shut-off device, which control device has a feed input and at least one input for the signal from the sensor and from said ignition switch, and has an output to the shut-off device and is programmed to measure the oil level only when the engine is off, after the ignition lock is placed in a first position, and a) if "correct", then to release the ignition lock for a predetermined period, so that the engine can be started, if necessary repeatedly, by placing the ignition lock in a second position, or b) if "too low", to open the shut-off device for a predetermined period, in order to allow a certain quantity of oil to the sump, then to measure the oil level again and, if "correct", to release the second or starting position of the ignition lock, the shut-off device comprising a pump driven by an electric motor, so that any topped-up volume is essentially constant and the topping-up tank can be at any desired height and distance relative to said sump.

2. Oil level regulator according to claim 1, wherein the control processor is further programmed so that c) if after the first topping-up the level is still found to be "too low", the shut-off device is opened a second time for the same predetermined period, and the oil is then measured and, if "correct", the second or starting position of the ignition lock is released.

3. Oil level regulator according to claim 2, wherein if, after the second topping-up period the level is still "too low", the control processor is programmed in such a way that it gives a signal that the oil has to be checked manually and/or that the control circuit is faulty, and an emergency switch with break seal in the circuit, in order to permit starting the engine bypassing the processor.

4. Oil level regulator according to claim 2, wherein the control processor is programmed in such a way that, before starting with the functions described, it first carries out a rapid self-check, such as of the sensor, the shut-off device, the electronic circuit and, with an additional sensor, of the oil level in the topping-up tank, in order to give a signal of "ok"/"fault" to a display or the like.

5. Oil level regulator according to claim 2, wherein a temperature sensor is provided for the oil temperature in the topping-up tank, and the processor extends the opening period of the shut-off device at decreased or falling temperature and shortens it at higher or rising temperature, so that an essentially constant oil volume is always added.

6. Oil level regulator according to claim 1, wherein the processor is programmed in such a way that it stores a number of oil checks, times of topping-up, a level in the topping-up tank and/or a control of an emergency switch, together with an indication of time, and subsequently has these available for reading via a port.

7. Oil level regulator according to claim 2, further comprising an angle of inclination sensor which sends a signal to the processor when a predetermined angle of the engine relative to the horizontal in any desired direction, is exceeded, so that the processor temporarily bypasses the blockage of starting.

* * * * *